United States Patent Office 3,244,670
Patented Apr. 5, 1966

3,244,670
CURING AGENT FOR EPOXIDES
Helmut Puchala, Hans Anselm, and Walter Keil, Munich, Germany, assignors to Consortium fur Elektrochemische Industrie G.m.b.H., Munich, Germany
No Drawing. Filed Sept. 26, 1962, Ser. No. 226,471
Claims priority, application Germany, Oct. 3, 1961, C 25,179
1 Claim. (Cl. 260—47)

The present invention relates to a process of curing epoxy resins catalytically with the aid of organic tin compounds.

Curing of epoxy resins with the aid of amines or acid anhydrides is known. However, certain epoxy resins in which one or more epoxy groups are a component of a ring system are hardened very poorly with amines. In addition, curing with amines is usually accompanied by discoloration of the resin.

Acids and acid anhydrides provide resin curing agent mixtures with very long gelling periods. Straight catalytic curing without other additions with Lewis acids, such as boron fluoride or boron fluoride complexes, does not always lead to mechanically suitable products (R. Wegler, Angew. Chem., vol. 67, page 589, 1955).

When the reaction between the epoxides and the curing agents proceeds rather slowly, it is known that relatively small quantities or accelerators may be added to the reaction mixtures. Examples of such accelerators are amines, especially tertiary amines, alkali metal phenolates and Friedel-Crafts type catalysts. In addition, organic sulfur containing compounds or compounds used in vulcanization of rubber can also be added as the accelerator.

Very often the resins produced exhibit considerable internal stresses caused by the type of catalyst employed, as well as, as a consequence of the curing process.

It has already been proposed to cure epoxy resins with metal salts of drying acids or related acids, preferably higher molecular weight fatty acids. German Patent 1,008,909 has also suggested the use of organo tin compounds, such as dibutyl tin maleate, in the place of such metal salts which in the older literature have been designated as metallo-organic compounds. Compounds of this type, while providing the desired pot life, are not very active as curing catalysts. They require high curing temperatures over long periods of time.

According to the invention it was unexpectedly found epoxy compounds could be cured with the aid of certain organo tin compounds which combine a long pot life with effective curing. The organo tin compounds which can be employed according to the invention, either singly or in admixture, are of the following general formulae:

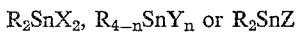

wherein

R designates radicals such as alkyl, cycloalkyl, aryl, aralkyl, alkaryl, alkoxy or aryloxy, which may be substituted if desired.
X is halogen, hydroxyl, metal substituted hydroxyl, cyanide, fluoroborate or an amino group.
Y is acyl, acyloxy or has the same significance as X.
Z is oxygen or sulfur and $n=0$, 1 or 3.

Examples of such compounds, for instance, are: trimethyl tin hydroxide, tributyl tin hydroxide, trimethyl tin chloride, dimethyl phenyl tin hydroxide, tributyl tin chloride, triphenyl tin chloride, trimethyl tin fluoroborate, triphenyl tin fluoroborate, dimethyl tin dichloride, dibutyl tin dichloride, diphenyl tin dichloride, dibenzyl tin dichloride, butyl tin trichloride, phenyl tin trichloride, dimethyl tin oxide, dibutyl tin oxide, diphenyl tin oxide and dibutyl tin sulfide.

By varying the type and quantity of the accelerators indicated above the gelling or hardening period can be adjusted according to desire. On the other hand, it is also possible to alter the technological properties of the resins cured according to the invention by selection of the substituents on the tin atom. The accelerators also expediently are selected with reference to their melting or boiling point or solvent action. They can be used alone or in conjunction with other known curing agents, such as carboxylic acids, dicarboxylic acid anhydrides, phenols, glycols and nitrogen compounds and the like. The components may be dissolved by short heating in the mixture to be hardened without the aid of solvents. Naturally, care must be taken that the solution is not held unnecessarily long at higher temperatures so as to avoid an undesired premature increase in viscosity. However, they also can be added to the resin hardener mixture in suited reactive solvents.

The organo tin compounds according to the invention are employed in quantities of about 0.05 to 2.5%, preferably about 0.3 to 1%, based on the weight of the epoxide.

The hardening or curing in general is effected at temperatures between 100 and 200° C. With especially active epoxides and tin compounds, hardening can, however, be achieved at temperatures below 100° C.

Epoxy resins, such as glycidyl ethers of polyphenols and polyalcohols, as well as epoxides of unsaturated fatty oils, terpenes, such as dipentene diepoxide and others, can be cured with the organo tin compounds according to the invention. Cyclic epoxy compounds, such as those, for example, derived from dicyclopentadiene and its derivatives, such as 3,4-epoxy dicyclopentadien-9-glycidyl ether and dicyclopentadiene diepoxide, can be cured with special advantage according to the invention. Epoxides of cyclohexane derivatives, such as 3,4-epoxy-6-methyl cyclohexyl methyl-3,4-epoxy-6-methyl cyclohexane carboxylate and vinyl cyclohexene diepoxide, can also be hardened according to the invention.

The epoxy compound-catalyst mixtures according to the invention are stable and remain thin liquids for longer periods of time at room temperature so that they can be stored without danger of premature reaction. On the other hand, they cure rapidly at elevated temperatures. The hardened cured products are almost colorless and clear and adhere firmly to surfaces such as metal or glass. The products are hard and strong and are resistant even at elevated temperatures to water, solvents, oils and corrosive materials. The cured resins are especially free of strains when the mixture to be cured consists of a combination of epoxy component, dicarboxylic acid anhydride, branched glycol and the organic tin compound according to the invention. A check of this inner softening effect is possible with clear castings by optical strain tests and the screw test. The resin mixture can be used as casting or laminating resins, adhesives, coating compositions and impregnating compositions. Their curing can be accomplished in polyester or polycarbonate molds from which the castings can be removed without difficulty.

The following examples will serve to illustrate the invention with reference to several embodiments thereof. The pencil hardness given in such examples for the cured bodies was determined according to Fette, Scifen, Anstrichmittel, December 1957, page 1070, and the Vicat temperature according to VDE 0302/III (previously DIN 57302).

*Example 1*

100 g. of 3,4-epoxy dicyclopentadienyl-9-glycidyl ether, hereinafter designated as "F5" for sake of brevity, were heated for a short period of time to 40–50° C. together with 30 g. of maleic acid anhydride and 0.5 g. of triphenyl tin chloride while stirring. The resulting completely clear liquid of low viscosity did not alter its state during 6 days' storage at room temperature. After 1 hour's heating at 150° C. the pencil hardness achieved was 5H and the Vicat temperature was over 250° C.

In a comparative test using dibutyl tin dilaurate instead of the triphenyl tin chloride, only an increase in viscosity but no hardening could be achieved.

In a further comparative test under the same conditions but in the absence of any organic tin compound, no hardening whatsoever was observed.

*Example 2*

100 g. of epoxy compound "F5" were heated for a short period while stirring to 40–50° C., together with 37.5 g. of maleic acid anhydride, 25 g. 2-methyl pentane diol-2,4 and 0.5 g. of triphenyl tin chloride. After 4 days' standing an increase in viscosity in the mixture began so that the mixture was gelatinous after 6 days. After heating the mixture 1 hour at 150° C. the pencil hardness attained was 5H. Completely homogeneous, strain free, impact resistant clear plates were obtained after heating the mixture for 3 hours at 150° C. in molds lined with polyester sheets. The Vicat temperature was 90° C. at a pencil hardness of 6H. By replacement of the 2-methyl pentane diol-2,4 with 3-methyl pentane diol-2,4 a Vicat temperature of 124° C. was achieved.

*Example 3*

A mixture of 100 g. of "F5," 30 g. of maleic acid anhydride, 20 g. of 2-methyl pentane diol-2,4 and 0.5 g. of triphenyl tin hydroxide was prepared as in the previous examples. The pot life of the finished mixture was 4 days. After 1 hour's curing at 150° C. a pencil hardness of 3H was achieved in the clear strainless test pieces.

*Example 4*

A mixture was prepared as in Example 3 except that the triphenyl tin hydroxide was replaced with triphenyl tin fluoroborate. After 1 hour's curing at 150° C. the hardness of the test pieces was 3H.

*Example 5*

100 g. of 3,4-epoxy-6-methyl cyclohexyl-methyl-3,4-epoxy-6-methyl cyclohexane-carboxylate were heated with 37.5 g. of maleic acid anhydride, 25 g. of 2-methyl pentane diol-2,4- and 0.6 g. of triphenyl tin chloride for 3 hours at 150° C. After removal from the molds and removal of the polyester sheets, the Vicat hardness of the weakly yellow glass clear plate was 71° C. with a pencil hardness of 6H. Without addition of the tin compound no hardening occurred under these conditions.

*Example 6*

100 g. of "F5," 37 g. of maleic acid anhydride, 25 g. of azelaic acid and 0.6 g. of triphenyl tin chloride were mixed together. After 1 hour's curing at 150° C. the Vicat temperature was over 250° C. The hardness of the clear, strainless weakly yellow test pieces was 3H. Without addition of the tin compound no hardening occurred under these conditions.

*Example 7*

A solution of 0.5 g. of triphenyl tin chloride in 1 g. of dimethyl diglycol was mixed with 100 g. of Epikote 815 (polymeric glycidyl ether of diphenylol propane) and 26 g. of maleic acid anhydride while stirring and heating. After 25 minutes' heating of the resulting solution to 150° C. a clear yellow but not completely strainless casting of a hardness of 2H was obtained. When the solution was allowed to stand for 4 days no change in viscosity occurred. In the absence of the tin catalyst no hardening occurred.

*Example 8*

100 g. "F5," 37 g. of maleic acid anhydride and 0.07 g. of triphenyl tin chloride were mixed. The mixture was stable on 28 days' standing. After 1 hour's curing at 150° C. the Vicat temperature of the clear weakly yellow test piece was 200° C. The extraction value after 1 hour's treatment with boiling methyl isobutyl ketone was 3.9%.

*Example 9*

100 g. of "F5," 37 g. of maleic acid anhydride and 0.8 g. of triphenyl tin chloride were mixed. The finished mixture was stable on standing for 8 days. After 1 hour's curing at 150° C. the Vicat temperature was over 250° C. and the extraction value only 0.04%.

*Example 10*

A mixture of 100 g. of "F5," 75 g. of iso-octenyl-succinic acid anhydride, 17.1 g. of glycerine and 0.15 g. of triphenyl tin chloride was cured for 3 hours at 150° C. The resulting clear, strainless, tough impact resistant plate had a Vicat temperature of 88° C.

*Example 11*

A mixture of 100 g. of 3,4-epoxy-6-methyl cyclohexyl-methyl-3,4-epoxy-6-methyl cyclohexane-carboxylate, 94 g. of dimeric linoleic acid (Empol 1014) and 1.95 g. of triphenyl tin chloride was cured for 3 hours at 150° C. The resulting impact resistant tough plate had a Vicat temperature of 56° C.

*Example 12*

0.5 g. of triphenyl tin laurate dissolved in 5 g. glycolic acid butyl ester were added to 100 g. of "F5," 30 g. of maleic acid anhydride and 15 g. of 3-methyl pentane diol-2,4. After 1 hour's curing at 150° C. the clear test piece had a hardness of H.

*Example 13*

100 g. of 3,4-epoxy-6-methyl cyclohexyl-methyl-3,4-epoxy-6-methyl cyclohexane-carboxylate, 30 g. of maleic acid anhydride and 15 g. of 3-methyl heptane diol-2,4 were heated together with 0.5 g. of dibenzyl tin dichloride dissolved in 5 g. of dimethyl diglycol for 15 minutes at 150° C. The clear weakly yellow test piece had a hardness of 2H.

*Example 14*

100 g. of the epoxy compound of Example 13, 30 g. of maleic acid anhydride and 15 g. of 3-methyl pentane diol-2,4 were mixed with 0.5 g. of hexabutyl distannoxane. After 1 hour's heating at 150° C. a clear test piece of a hardness of HB was obtained.

*Example 15*

A mixture of 100 g. of the epoxy compound of Example 13, 30 g. of maleic acid anhydride, 15 g. of 3-methyl heptane diol-2,4 and 0.5 g. of dibutyl tin dichloride after 1 hour's curing at 150° C. gave a clear product having a hardness of 2H.

When 18 g. of 3-methyl pentane diol-2,4 was used instead of the heptane diol and 0.5 g. of the following tin compounds were employed instead of the dibutyl tin dichloride the following hradnesses were obtained after 3 hours' curing at 150° C.:

| | |
|---|---|
| Tribenzyl tin acetate | 4H |
| Tributyl tin oleate | 3H |
| Diphenyl tin dichloride | 3H |
| Dibenzyl tin oxide | 3H |
| Tetraphenyl tin | 2H |
| Tetrabutyl tin | 2–3H |
| Tetramethyl tin | 3H [1] |
| Tetraethyl tin | 2H [1] |
| Dioctyl tin dichloride | 2–3H [1] |
| Trimethyl tin bromide | H [1] |

[1] After only 1 hour curing.

The tin compounds were admixed as 10% solutions in dimethyl diglycol or tetrahydrofurfuryl alcohol.

Example 16

A mixture of 80 g. of vinyl cyclohexene-diepoxide, 20 g. of maleic acid anhydride, 15 g. of 3-methyl pentane diol-2,4, 7 g. of tetrahydrofurfuryl alcohol and 0.7 g. of dibenzyl tin oxide hardened in 3 days at 40° C. to test pieces having a hardness of 2H.

Example 17

A mixture of 100 g. of the epoxy compound of Example 13, 30 g. of maleic anhydride, 15 g. of 3-methyl pentane diol-2,4 and 0.5 g. of triphenyl tin chloride was heated to 126° C. After 26 minutes the mixture began to cure and after 1 hour a test piece of a hardness of 4H was obtained. At 150° C. the curing began after only 15 minutes and at 180° C. after 10 minutes. The end hardnesses of the test pieces in each instance was 4H.

Example 18

A mixture of 100 g. of "F5," 30 g. of maleic acid anhydride, 15 g. of 3-methyl pentane diol-2,4 and 0.5 g. of diethyl hexyl tin acetate was heated for 15 minutes at 150° C. The resulting clear light yellow test piece was of a hardness of 2H.

Example 19

A mixture of 100 g. of "F5," 30 g. of maleic acid anhydride, 15 g. of 3-methyl pentane diol-2,4, and 0.3 part of N-tributyl tin imidazole was heated for 3 hours at 150° C. The resulting clear weakly brown test piece was of a hardness of 4H.

Example 20

A mixture of 100 g. of epoxy resin Epikote 828 (polymeric glycidyl ether of diphenylol propane), 11 g. of diethylene-triamine and 0.5 g. of triphenyl tin chloride after 12 hours' storage at 20° C. and a subsequent tempering at 150° C. for 1 hour gave a test piece having a hardness of 4H. In comparison, using the same composition and curing conditions but omitting the triphenyl tin chloride, a hardness of only 2H was attained.

Example 21

A mixture of 100 g. of the epoxy compound of Example 13, 79.5 g. of 3,4-epoxy-tricyclo[5,2,1,0$^{2.6}$]-decane-9-yl-gylcidyl ether, 2 parts of pyrogallol and 0.05 g. of triphenyl tin chloride was cured for 1 hour at 160° C. A test piece of a hardness of 5H was obtained.

We claim:

In a process for the production of a cured epoxy resin from a mixture containing (1) a vicinal-epoxy compound which has 2-vicinal-epoxy groups, (2) a dicarboxylic acid anhydride, and (3) a glycol, the step of adding to such mixture prior to cure 0.05 to 2.5% by weight with reference to the vicinal-epoxy compound of at least one organic tin compound of one of the formulae, $R_2SnX_2$, $R_3XnY$ and $R_2SnZ$, wherein each R is selected from the group consisting of alkyl, cycloalkyl, aryl and aralkyl, each X is selected from the group consisting of halogen, hydroxyl and fluoroborate, Y is selected from the group consisting of halogen, hydroxyl, fluoroborate and acyloxy, and Z is selected from the group consisting of oxygen and sulfur and heating such mixture to curing temperature to cure such mixture to a solid.

References Cited by the Examiner

UNITED STATES PATENTS

| | | |
|---|---|---|
| 2,327,053 | 8/1943 | Marple et al. |
| 2,947,717 | 8/1960 | Belanger et al. _____ 260—47 |
| 3,030,316 | 4/1962 | Bailey et al. _____ 260—2 |
| 3,147,285 | 9/1964 | Mack _____ 260—2 |

FOREIGN PATENTS 1,008,909  10/1957  Germany.

OTHER REFERENCES

Lee et al.: "Epoxy Resins," McGraw-Hill, 1957, New York, pp. 41 and 115.

WILLIAM H. SHORT, *Primary Examiner.*